United States Patent
Boes

(10) Patent No.: US 8,824,966 B2
(45) Date of Patent: Sep. 2, 2014

(54) SYSTEM AND METHOD FOR REDUCING SIGNAL INTERFERENCE BETWEEN BLUETOOTH AND WLAN COMMUNICATIONS

(75) Inventor: Barry S. Boes, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1739 days.

(21) Appl. No.: 11/504,940

(22) Filed: Aug. 16, 2006

(65) Prior Publication Data

US 2008/0045152 A1    Feb. 21, 2008

(51) Int. Cl.
  *H04B 1/00*   (2006.01)
  *H04B 15/00*  (2006.01)
  *H04W 16/14*  (2009.01)

(52) U.S. Cl.
  CPC .................................. *H04W 16/14* (2013.01)
  USPC ........................................................ 455/63.1

(58) Field of Classification Search
  CPC ......... H04W 88/06; H04W 84/12; H04B 1/04
  USPC ....................................................... 455/63.1
  See application file for complete search history.

(56) References Cited

U.S. PATENT DOCUMENTS

| | | | |
|---|---|---|---|
| 6,895,255 B1 | 5/2005 | Bridgelall | 455/552.1 |
| 6,978,121 B1* | 12/2005 | Lane et al. | 455/73 |
| 6,990,082 B1* | 1/2006 | Zehavi et al. | 370/280 |
| 7,039,358 B1 | 5/2006 | Shellhammer et al. | 455/41.2 |
| 7,046,649 B2* | 5/2006 | Awater et al. | 370/338 |
| 2004/0029619 A1* | 2/2004 | Liang et al. | 455/562.1 |
| 2004/0162023 A1* | 8/2004 | Cho | 455/41.1 |
| 2004/0242159 A1 | 12/2004 | Calderon et al. | 455/63.3 |
| 2005/0215197 A1* | 9/2005 | Chen et al. | 455/41.2 |
| 2006/0030265 A1* | 2/2006 | Desai et al. | 455/41.2 |
| 2007/0021066 A1* | 1/2007 | Dravida et al. | 455/41.2 |

OTHER PUBLICATIONS

HP Invent, "Wi-Fi™ and Bluetooth™—Interference Issues," Jan. 2002, cover and pp. 1-5.
Charles Hodgton, "Adaptive Frequency Hopping for Reduced Interference Between Bluetooth® and Wireless LAN," Ericson Technology Licensing, May 2003, D&R Headline News, pp. 1-4.
Phillips Semiconductors, "How 802.11b/g WLAN and Bluetooth Can Play," 2005, 5 pgs.
Anand Raghavan et al., "An Active Interference Canceller for Multistandard Collocated Radio," Georgia Electronic Design Center, 2005, 4 pgs.
Matthew B. Shoemake, Ph.D., "Wi-Fi (IEEE 802.11b) and Bluetooth Coexistence Issues and Solutions for the 2.4 GHz ISM Band," Texas Instruments, Feb. 2001, Version 1.1, pp. 1-17.
Texas Instruments, "Wireless Performance Optimization Solutions: Bluetooth® and 802.11 Coexistence," Product Bulletin, 2003, 4 pgs.

* cited by examiner

*Primary Examiner* — Ankur Jain
(74) *Attorney, Agent, or Firm* — Egan, Peterman & Enders LLP.

(57) ABSTRACT

Methods and systems are disclosed for reducing signal interference between Bluetooth (BT) and WLAN (e.g. WiFi) communications in an information handling system. The WLAN receiver has configurable front-end filter circuitry. Based upon information concerning the BT frequency region for current BT communications, the WLAN receiver can adjust or set its configurable front-end filter circuitry to filter out the BT communications. As the BT communications hop from frequency to frequency, the WLAN receiver can continue to adjust its configurable front-end filter circuitry accordingly. Example implementations for the configurable front-end filter circuitry include bandpass filters and selectable low pass and high pass filters. These filters are selected and/or tuned such that BT frequency regions are filtered from the WLAN input signal before further WLAN signal processing is conducted, thereby improving the performance of simultaneous BT and WLAN communications.

14 Claims, 5 Drawing Sheets

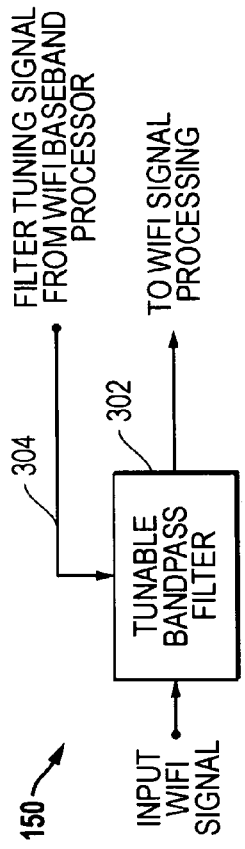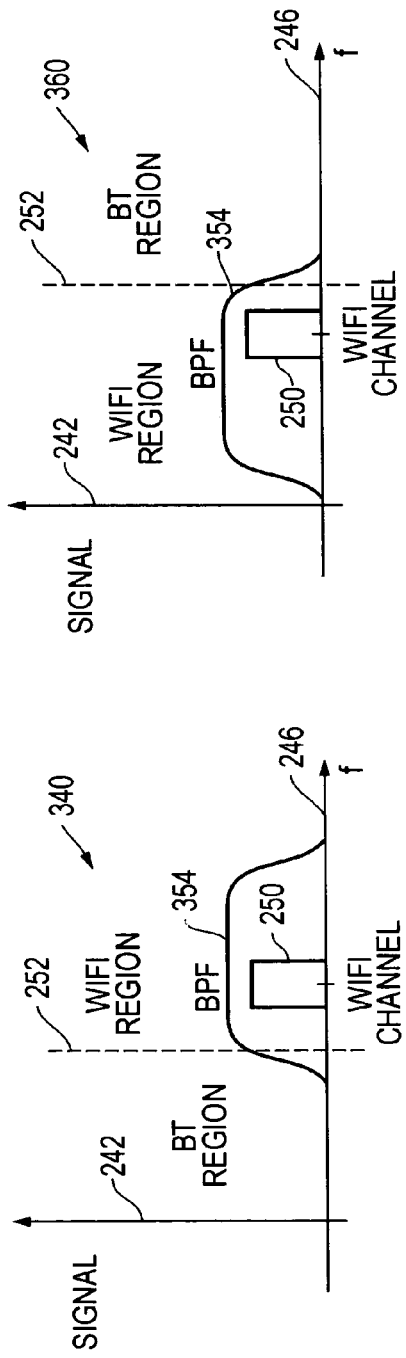
FIG. 3A
FIG. 3B
FIG. 3C

SYSTEM AND METHOD FOR REDUCING SIGNAL INTERFERENCE BETWEEN BLUETOOTH AND WLAN COMMUNICATIONS

TECHNICAL FIELD OF THE INVENTION

This invention relates to methods and systems for reducing signal interference between Bluetooth communications and wireless local area network (WLAN) communications with respect to an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some information handling systems provide wireless communications on multiple communication protocols. For example, some information handling systems provide Bluetooth (BT) wireless communication capabilities and wireless local area network (WLAN) communication capabilities. Bluetooth is a wireless personal area network (WPAN) technology from the Bluetooth Special Interest Group, and Bluetooth is an open standard for short-range transmission of digital voice and data that supports point-to-point and multipoint applications. For WLAN communications, protocols within the IEEE 802.11 standard are often utilized. IEEE 802.11 is a family of IEEE standards for WLANs that were designed to extend wired Ethernet into the wireless domain. The 802.11 standard is more widely known as "Wi-Fi" because the Wi-Fi Alliance, an organization independent of IEEE, provides certification for products that conform to the 802.11 standard. In addition to WiFi, there are other old technologies and new evolving technologies that can be used to provide WLAN capabilities.

One problem with combined Bluetooth and WiFi communication capabilities is that Bluetooth and WiFi networks operate in the same frequency spectrum. Filters on the front-end of communication systems for information handling systems using Bluetooth and WiFi communications typically include wideband filters that pass the entire WiFi spectrums. Thus, there is no channel selectivity provided by these filters for the WiFi communications. Because of the close proximity of the antennas that provide both Bluetooth and WiFi communications, Bluetooth and WiFi technologies interfere with each other when operating simultaneously. This interference often results in significant data throughput reduction of both technologies.

A co-existence scheme, therefore, is desirable in order to reduce or eliminate interference between the two wireless technologies while they are operating simultaneously in the same device. One such scheme is called the Bluetooth adaptive frequency hopping (AFH) channel avoidance scheme. This scheme attempts to design the hopping scheme for the Bluetooth communications in such a way that WLAN channels are avoided. In another current co-existence scheme, a Bluetooth device monitors operating signals from a WiFi device and remains off during the operation of the WiFi device. This results in improved WiFi (e.g., 802.11b/g) throughput, at the expense of a significant reduction of 90% or more in throughput in the Bluetooth communications. In addition, this technique requires the Bluetooth transmitter of the BT radio to be turned off while a receiver of the WiFi radio is receiving a signal in order to avoid or reduce signal interference between Bluetooth and WiFi communications. Another other prior system has used a divided spectrum method to allow both BT and WiFi radios to operate simultaneously. In this solution, Bluetooth communications are allocated a fixed communication bandwidth, and the WiFi communications were allocated a separate fixed communication bandwidth. Once these communication bandwidths are divided and fixed, then communications can occur in the separate bandwidths, thereby reducing interference. However, a disadvantage of this solution is that it forces a modification to the usable signal spectrums for both communication protocols.

Prior solutions to the problem of interference between Bluetooth communications and WLAN (e.g. WiFi) communications, therefore, have not efficiently and effectively dealt with the problem. Further solutions that reduce interference while preserving throughput are desirable.

SUMMARY OF THE INVENTION

The present invention provides a method and system for utilizing configurable front-end filter circuitry to reduce signal interference between Bluetooth and wireless local area network (WLAN) communications with in an information handling system. Based upon the frequency location of WLAN communications and the frequency location of Bluetooth communications, the configurable front-end filter circuitry can be adjusted to provided selectivity to the WLAN communications and to filter out Bluetooth communications. As the Bluetooth communication frequencies change or hop to different frequencies, the configurable front-end filter circuitry can be reconfigured such that it continues to filter out Bluetooth communications from the WLAN receiver circuitry. This electronically tunable front-end filter system for the WLAN communications provides significant advantages and also allows existing Bluetooth co-existence schemes, such as the Bluetooth AFH (Adaptive Frequency Hopping) channel avoidance scheme, to operate properly in the same proximity as a WLAN (e.g., 802.11b/g) receiver thereby increasing and/or optimizing the Bluetooth throughput and the number of channels usable by Bluetooth in information handling systems having both capabilities.

In one embodiment, the present invention is a method of reducing signal interference between Bluetooth and WLAN communications in an information handling system, including providing an information handling system with a Bluetooth transceiver and a WLAN transceiver where the WLAN transceiver has a configurable front-end filter system, determining a frequency region for WLAN communications, determining a frequency region for Bluetooth communications that does not overlap with the WLAN frequency region, and setting the front-end filter system for the WLAN transceiver to reduce signals within the Bluetooth frequency region. In addition, the method can further include changing the frequency region for Bluetooth communications and again setting the front-end filter system for the WLAN receiver to reduce signals with the Bluetooth frequency region. Further, the front-end filter system can be implemented as a low pass filter and a high pass filter, as a tunable bandpass filter, or as some other desired filter system. Still further, the WLAN communications can be WiFi communications, and the Bluetooth communications can utilize an adaptive frequency hopping channel avoidance scheme. As described below, other features and variations can be implemented, if desired, and related systems can be utilized, as well.

In another embodiment, the present invention is an information handling system having reduced interference between Bluetooth and WLAN communications, including a Bluetooth transceiver configured to communicate in a Bluetooth frequency region, a Bluetooth baseband processor coupled to the Bluetooth transceiver, a WLAN transceiver configured to communicate in a WLAN frequency region and a WLAN baseband processor coupled to the WLAN transceiver, where the WLAN transceiver includes configurable front-end filter circuitry having a control signal that sets the front-end filter circuitry to filter frequencies within the Bluetooth frequency region. In addition, the WLAN baseband processor can be configured to receive Bluetooth channel information from the Bluetooth baseband processor and to use the Bluetooth channel information to generate the control signal. Further, the front-end filter circuitry can include a switch coupled to a low pass filter and a high pass filter, the switch configured to select the low pass filter or the high pass filter based upon the control signal. The front-end filter circuitry can also include a tunable bandpass filter where the center frequency for the tunable bandpass filter is dependent upon the control signal. Other filter systems could also be utilized, as desired. Still further, the Bluetooth communications can hop from channel to channel, and the WLAN processor can be configured to receive Bluetooth channel information from the Bluetooth baseband processor each time the Bluetooth transceiver is to hop to a new channel. As described below, other features and variations can be implemented, if desired, and a related method can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 3A is a diagram of an alternate embodiment for front-end filter circuitry within a WiFi transceiver system using selectable low and high pass filters for the configurable WiFi front-end filter circuitry.

FIG. 3B is a signal diagram showing the bandpass filter in FIG. 3A centered such that high frequencies are passed for WiFi channels;

FIG. 3C is a signal diagram showing bandpass filter in FIG. 3A centered such that low frequencies are passed for WiFi channels;

DETAILED DESCRIPTION OF THE INVENTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a server computer system, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of non-volatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

The present invention provides systems and methods for reducing signal interference between Bluetooth and wireless local area network (WLAN) communications in an information handling system. Based upon the frequency location of WLAN communications and the frequency location of Bluetooth communications, a configurable front-end WLAN filter system can be set or adjusted to provided selectivity to the WLAN communications and to filter out Bluetooth communications.

Figure 1:
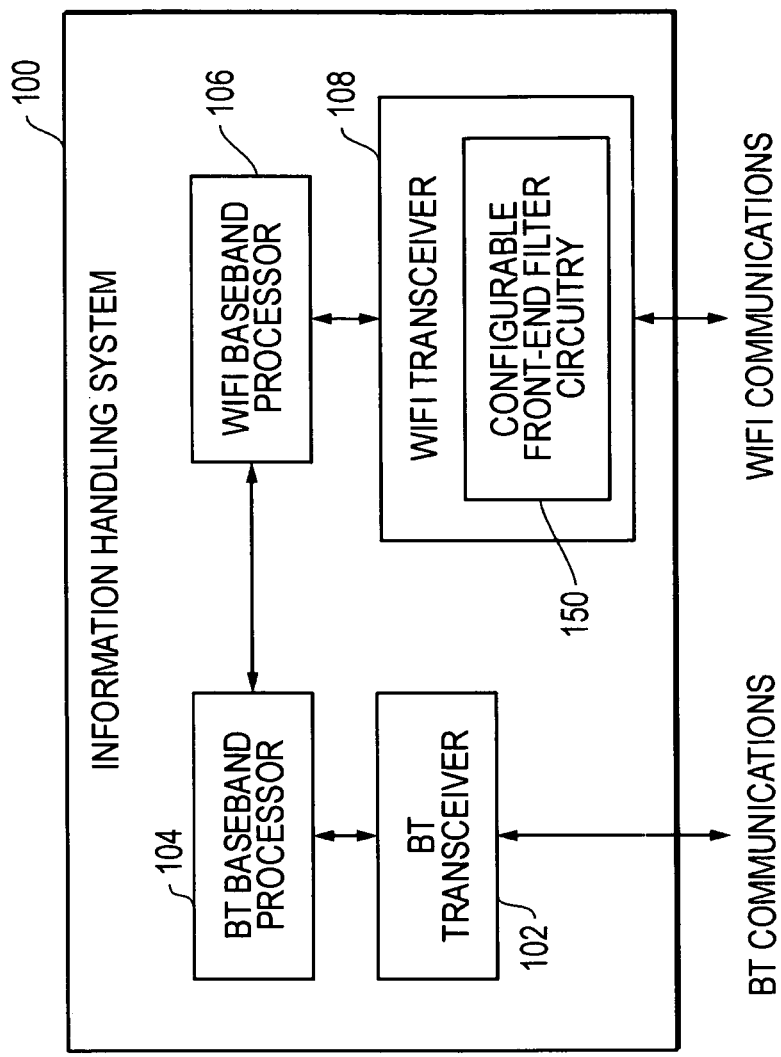
FIG. 1 is a block diagram of an information handling system having Bluetooth and WiFi communication capabilities and configurable WiFi front-end filter circuitry.
Figure 2A:
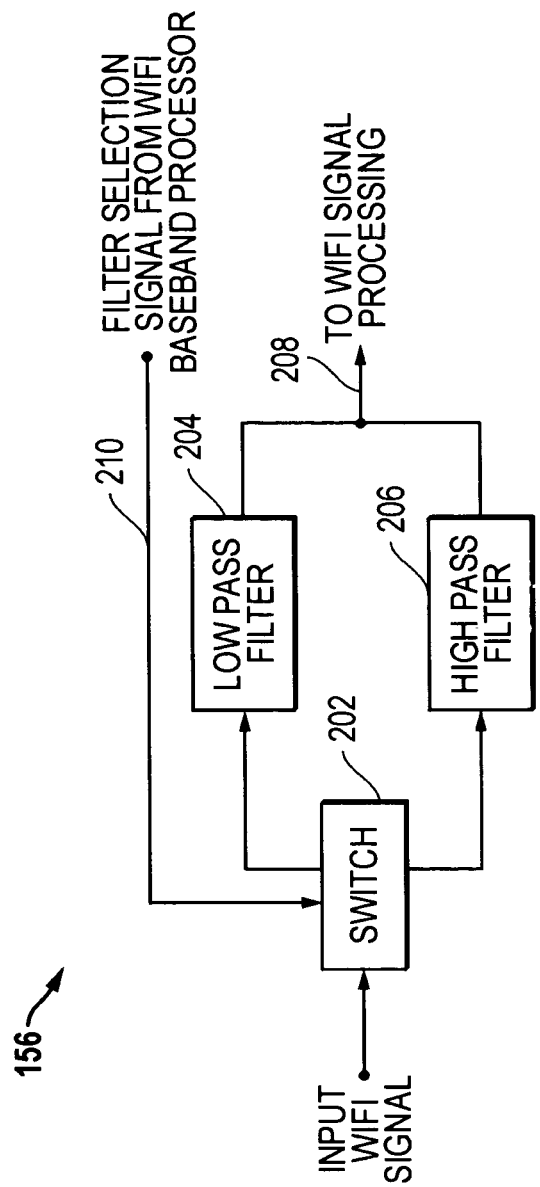
FIG. 2A is a diagram of front-end filter circuitry within a WiFi transceiver system using selectable low and high pass filters for the configurable WiFi front-end filter circuitry.
Figure 2C:
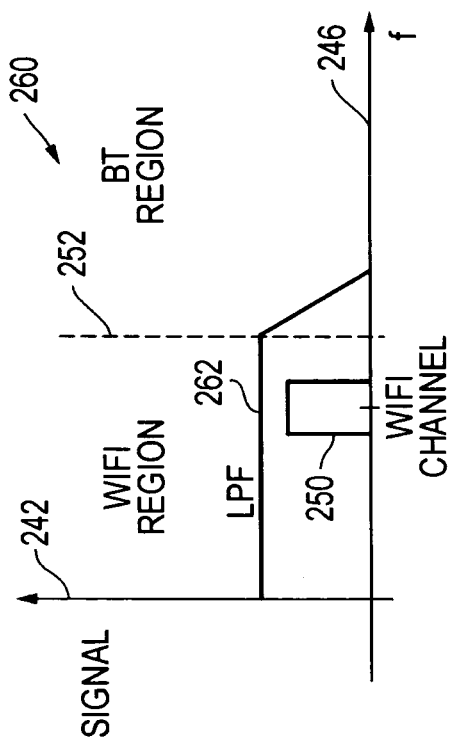
FIG. 2C is a signal diagram showing low pass filter selection in FIG. 2A.
Figure 2B:
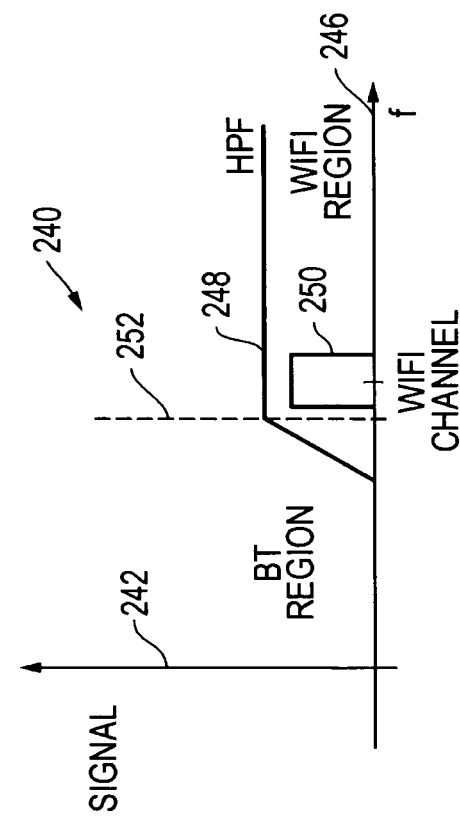
FIG. 2B is a signal diagram showing high pass filter selection in FIG. 2A.
Figure 4:
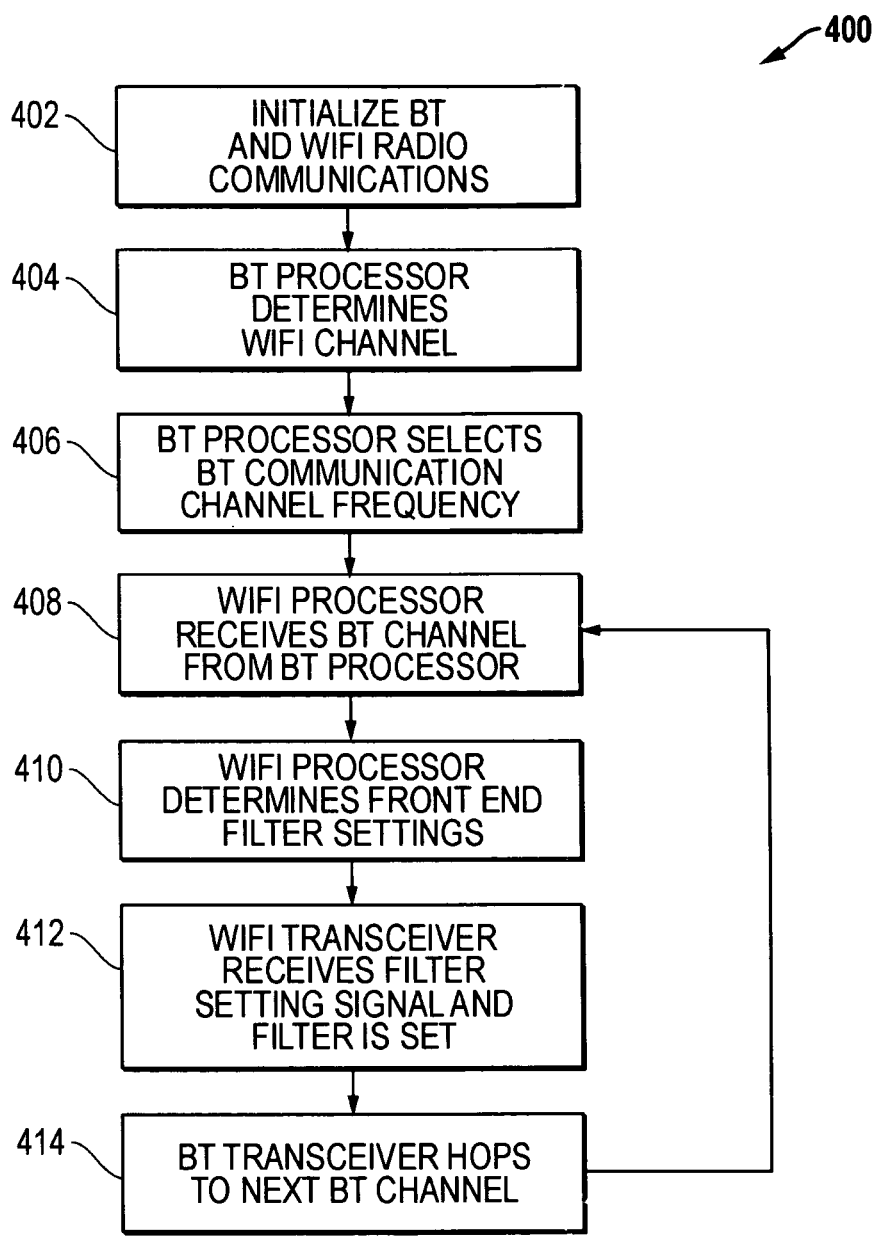
FIG. 4 is a flowchart of an information handling system for reducing signal interference between Bluetooth and WLAN communications.

FIG. 1 is an example embodiment for an information handling system having Bluetooth and WLAN capabilities and a configurable front-end WLAN filter system. FIG. 2A and FIG. 3A provide different embodiments for implementing the configurable front-end WLAN filter circuitry. FIGS. 2B and 2C provide example filter selections based upon the circuitry of FIG. 2A. FIGS. 3B and 3C provide example filter tuning based upon the circuitry of FIG. 3A. FIG. 4 is an example process for achieving reduced interference. Although the below discussion related to these drawings focuses on WiFi communications as the WLAN protocol, other WLAN protocols and solutions could also be utilized. As discussed above, "WiFi" refers to a WLAN protocol that meets the IEEE 802.11 family of standards.

FIG. 1 shows a diagram of an information handling system 100 having both Bluetooth (BT) transceiver 102 and WiFi transceiver 108. The Bluetooth transceiver 102 is configured to provide Bluetooth communications, and a Bluetooth baseband processor 104 is coupled to the Bluetooth transceiver 102 to provide the Bluetooth related signal processing. The WiFi transceiver 108 is configured to communicate in a WLAN frequency region to provide WiFi communications, and a WiFi baseband processor 106 is coupled to the WiFi transceiver 108 to provide the WiFi related signal processing. The WiFi transceiver 108 also includes configurable front-end filter circuitry 150, as discussed in further detail below, that can be set to filter out the Bluetooth communications. The WiFi baseband processor 106 and the BT baseband processor 104 can communicate with each other to provide control signals and information concerning Bluetooth and WiFi channel information and operation.

In operation, as discussed further below, a frequency region can first be determined for WiFi (or WLAN) communications. A frequency region can then be determined for Bluetooth communications that does not overlap with the WiFi (or WLAN) frequency region. The front-end filter circuitry 150 is then configured or selected for the WiFi transceiver 108 to reduce signals within the Bluetooth frequency region. As the Bluetooth communications hop between frequencies, the configurable front-end filter circuitry 150 can be reconfigured so that the Bluetooth communications are filtered. As such, while the Bluetooth communications hop from frequency to frequency, the configurable front-end filter circuitry 150 is configured and reconfigured based upon the next BT hop frequency.

FIGS. 2A-C and FIGS. 3A-C provide example embodiments for the configurable front-end WiFi filter circuitry 150. In particular, FIG. 2A depicts an embodiment in which selectable low pass and high pass filters are used, and FIG. 3A depicts an embodiment in which a bandpass filter is used.

It is understood that any type of configurable or selectable filter implementation and any number of individual filters, either passive or active or both, could be used to provide the filter selection capability for the WiFi transceiver 108. According to the present invention, this configurable front-end filter circuitry is used to filter out Bluetooth communications as the Bluetooth communications move from frequency to frequency and allow for the Bluetooth communications to move above and below the WLAN communication channels. Because the Bluetooth region can move around, for example, through Bluetooth frequency hops, it is desirable and advantageous to have the ability to change the location or response of the filters used. The WiFi processor can be configured to receive Bluetooth channel information from the Bluetooth baseband processor each time the Bluetooth transceiver is to hop to a new channel. The tunable bandpass filter 302 can then adjust the configurable front-end filter circuitry accordingly depending upon the location of the Bluetooth frequency region with respect to the WLAN frequency region. The present invention, therefore, allows for simultaneous operation of Bluetooth and WLAN communications where the Bluetooth frequency region will sometimes be at higher frequencies than the WLAN frequency region and, at other times, will be at lower frequencies than the WLAN frequency region. This configurability of the filter circuitry to follow the location of the Bluetooth communications provides significant advantages.

Looking now to FIG. 2A, an example embodiment is depicted for front-end filter circuitry 150 within a WiFi transceiver 108 using selectable filters. Signals received by the WiFi transceiver 108 are processed by the front-end filter circuitry 150 before being passed on for further processing by the WiFi processor 106, as shown in FIG. 1. As shown in FIG. 2A, one configuration of selectable filters may be a low pass filter 204 and a high pass filter 206 coupled to a switch 202. The switch 202 determines whether the input WiFi signal is processed by the low pass filter 204 or by the high pass filter 206 before being passed on for further WiFi signal processing. A filter selection signal 210, for example, from the WiFi baseband processor 106, can be used to make the filter selection between the low pass filter 204 and the high pass filter 206. If the Bluetooth frequency region for Bluetooth communications is higher than the WiFi frequency region for WiFi communications, the low pass filter 204 is selected. If the Bluetooth frequency region for Bluetooth communications is lower than the WiFi frequency region for WiFi communications, the high pass filter 204 is selected. The filter selection signal 210, therefore, allows the configurable front-end filter circuitry 150 to be configured to filter out BT communications, thereby improving the performance of the WiFi transceiver even while BT communications are simultaneously occurring.

FIG. 2B shows a signal diagram 240 where the high pass filter 206 has been selected in FIG. 2A. Frequencies (f) are represented by the x-axis 246, and signals are represented by the y-axis 242. As depicted, WiFi communications are expected to occur within a first frequency region (WiFi region) that is to the right of the dotted line 252. Element 250 represents the WiFi communication channel with its center frequency in the middle of the WiFi channel 250. Bluetooth communications are expected to occur in a different frequency region (BT region) that is to the left of the dotted line 252. The dotted line 252 represents the transition between the BT region and the WiFi region and correlates to the corner frequency for the high pass filter (HPF) 206. The line 248 represents the filter response for the HPF 206. Thus, to the left of the dotted line 252, the HPF 206 tends to block or filter out frequencies as shown by the HPF filter response 248. To the right of the dotted line 252, the HPF 206 tends to allow or pass frequencies as shown by the HPF filter response 248. The configurable front-end filter circuitry 150 within the WiFi transceiver 108, therefore, effectively blocks out the Bluetooth communications and allows the WiFi communications, thereby improving performance of the WiFi communications even though Bluetooth and WiFi communications are occurring at the same time.

FIG. 2C shows a signal diagram 260 where the low pass filter 204 has been selected in FIG. 2A. Again, frequencies (f) are represented by the x-axis 246, and signals are represented by the y-axis 242. As depicted, WiFi communications are expected to occur within a first frequency region (WiFi region) that is to the left of the dotted line 252. Element 250 again represents the WiFi communication channel with its center frequency in the middle of the WiFi channel 250. Bluetooth communications are expected to occur in a different frequency region (BT region) that is to the right of the dotted line 252. The dotted line 252 represents the transition between the BT region and the WiFi region and correlates to the corner frequency for the low pass filter (LPF) 204. The line 262 represents the filter response for the LPF 204. Thus, to the right of the dotted line 252, the LPF 204 tends to block or filter out frequencies as shown by the LPF filter response 262. To the left of the dotted line 252, the LPF 204 tends to allow or pass frequencies as shown by the LPF filter response 262. The configurable front-end filter circuitry 150 within the WiFi transceiver 108, therefore, effectively blocks out the Bluetooth communications and allows the WiFi communications, thereby improving performance of the WiFi communications even though Bluetooth and WiFi communications are occurring at the same time.

FIG. 3A shows an alternative embodiment for configurable front-end filter circuitry 150 using a tunable bandpass filter. A tunable bandpass filter 302 receives the WiFi input signal before it is passed on for additional WiFi signal processing. A filter tuning signal 304, for example, from the WiFi baseband processor 106, can be used to select or adjust the tuning for the bandpass filter 302. For example, the center frequency for the tunable bandpass filter 302 can be dependent upon the filter tuning signal 304. The WiFi processor 106 selects the center frequency for the tunable bandpass frequency 302 based upon the location of the Bluetooth frequency region. If the Bluetooth frequency region for Bluetooth communications is higher than the WiFi frequency region for WiFi communications, the tunable bandpass filter 302 is moved lower such that its upper end covers the location for WiFi communications. If the Bluetooth frequency region for Bluetooth communications is lower than the WiFi frequency region for WiFi communications, the tunable bandpass filter is moved higher such that its lower end covers the location for WiFi communications. The filter selection signal 304, therefore, allows the configurable front-end filter circuitry 150 to be configured to filter out BT communications, thereby improving the performance of the WiFi transceiver even while BT communications are simultaneously occurring.

FIG. 3B shows a signal diagram 340 illustrating an environment where the BT frequency region is lower than the WiFi frequency region. Again, frequencies (f) are represented by the x-axis 246, and signals are represented by the y-axis 242. As depicted, WiFi communications are expected to occur within a first frequency region (WiFi region) that is to the right of the dotted line 352. Element 250 again represents the WiFi communication channel with its center frequency in the middle of the WiFi channel 250. Bluetooth communications are expected to occur in a different frequency region (BT region) that is to the left of the dotted line 352. The dotted line 352 represents the transition between the BT region and the WiFi region correlates to the lower corner frequency for the bandpass filter (BPF) 302. The line 354 represents the bandpass filter (BPF) response for the BPF 302. Thus, below the dotted line 352, the BPF 302 tends to block or filter out frequencies as shown by the BPF filter response 354. Above the dotted line 352, the BPF 302 tends to allow or pass frequencies, as shown by the BPF filter response 354, up until the upper frequency corner of the BPF 302. The bandpass filter 302, therefore, has been centered such that the WiFi channel 250 falls within the lower end of the frequencies passed by bandpass filter 302. The configurable front-end filter circuitry 150 within the WiFi transceiver 108 effectively blocks out the Bluetooth communications and allows the WiFi communications, thereby improving performance of the WiFi communications even though Bluetooth and WiFi communications are occurring at the same time.

FIG. 3C shows a signal diagram 340 illustrating an environment where the BT frequency region is higher than the WiFi frequency region. Again, frequencies (f) are represented by the x-axis 246, and signals are represented by the y-axis 242. As depicted, WiFi communications are expected to occur within a first frequency region (WiFi region) that is to the left of the dotted line 352. Element 250 again represents the WiFi communication channel with its center frequency in the middle of the WiFi channel 250. Bluetooth communications are expected to occur in a different frequency region (BT region) that is to the right of the dotted line 352. The dotted line 352 represents the transition between the BT region and the WiFi region and correlates to the upper corner frequency for the bandpass filter (BPF) 302. The line 354 represents the bandpass filter (BPF) response for the BPF 302. Thus, above the dotted line 352, the BPF 302 tends to block or filter out frequencies as shown by the BPF filter response 354. Below the dotted line 352, the BPF 302 tends to allow or pass frequencies, as shown by the BPF filter response 354, up until the lower frequency corner of the BPF 302. The bandpass filter 302, therefore, has been centered such that the WiFi channel 250 falls within the upper end of the frequencies passed by bandpass filter 302. The configurable front-end filter circuitry 150 within the WiFi transceiver 108 effectively blocks out the Bluetooth communications and allows the WiFi communications, thereby improving performance of the WiFi communications even though Bluetooth and WiFi communications are occurring at the same time.

FIG. 4 is a flowchart for an example embodiment 400 of a process for reducing signal interference between Bluetooth and WLAN communications with respect to an information handling system that includes both a Bluetooth transceiver and a WLAN (e.g. WiFi) transceiver, with the WLAN transceiver having configurable front-end filter circuitry. First, in step 402, Bluetooth and WiFi radio communications are initialized. In step 404, the Bluetooth processor determines the WLAN channel that is being used for WLAN communications. In step 406, the Bluetooth processor selects a Bluetooth communication channel frequency. In step 408, the WLAN processor receives the Bluetooth channel information from the Bluetooth processor. In step 410, the WLAN processor determines settings for the configurable front-end filter circuitry. As discussed above, the configurable front-end filter circuitry can be implemented as a wide variety of filter systems that can filter out BT communications as they hop around to different frequencies. The settings determined in step 410 will depend upon the filter circuitry utilized. For example, with respect to FIG. 2A, the setting is the filter control signal that selects between the low pass filter 204 and the high pass filter 206. With respect to FIG. 3A, the setting is the filter tuning signal that determines the center frequency for the bandpass filter. In step 412, these filter settings are received by the WiFi transceiver, and the WiFi transceiver sets the filter circuitry accordingly. In step 414, the Bluetooth transceiver hops to a next Bluetooth channel. When this occurs, the process repeats back to step 408. Thus, each time the BT communications move to a new channel or hop from channel to channel, the WiFi transceiver can set the configurable front-end filter circuitry accordingly.

The methods and systems disclosed, therefore, effectively redesign the WLAN receiver front-end filter circuitry to reduce the bandwidth of WLAN signals allowed to pass unfiltered to the WLAN processor. As described above, electronically tunable or configurable filters can be used, such as narrow band, high-Q pre-select filters (e.g., a single bandpass filter or switchable high pass and low pass filters) with a center or corner frequency being tuned via varactor diode or through the use of other electronically tunable circuitry. The disclosed embodiments utilize Bluetooth frequency knowledge to set the configurable front-end filter circuitry on the side of the WLAN signal spectrum to which the Bluetooth signal has hopped. If desired, by designing the filter for precise attenuation on one band edge, the number of poles required in the filter can be reduced, thereby reducing costs. As indicated above, the filter circuitry could also be implemented using active or passive filters, as desired, and could be integrated into a BT or WLAN integrated circuit. The disclosed systems and methods also allow Bluetooth communications utilizing the adaptive frequency hopping (AFH) channel avoidance scheme, which is currently being implemented in some solutions. In summary, the disclosed systems and methods help reduce the operational interference caused by Bluetooth communications in the same proximity as WLAN (e.g., WiFi) communications, thereby improving Bluetooth throughput and increasing the number of channels usable for Bluetooth communications, as compared with prior solutions.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A method of reducing signal interference between simultaneous Bluetooth and WLAN communications in an information handling system, comprising:
   providing an information handling system with a Bluetooth transceiver and a WLAN transceiver, the WLAN transceiver having a configurable front-end filter system including a low pass filter and a high pass filter;
   identifying a channel for WLAN communications;
   selecting a channel for Bluetooth communications, the Bluetooth communications configured to utilize a plurality of different channels;
   determining whether a frequency location for the channel for Bluetooth communications is higher or lower than the channel for WLAN communications;
   utilizing the low pass filter if the channel for Bluetooth communications is higher than the channel for WLAN communications;
   utilizing the high pass filter if the channel for Bluetooth communications is lower than the channel for WLAN communications;
   operating the Bluetooth transceiver and the WLAN transceiver to provide simultaneous Bluetooth and WLAN communications;
   hopping to a different one of the plurality of different channels for the Bluetooth communications; and
   repeating the determining, utilizing, operating and hopping steps for each of the plurality of different channels.

2. The method of claim 1, wherein the WLAN communications comprise WiFi communications.

3. The method of claim 1, wherein the Bluetooth communications utilize an adaptive frequency hopping channel avoidance scheme.

4. The method of claim 1, wherein a corner frequency for the low pass filter is electronically tunable.

5. The method of claim 1, wherein a corner frequency for the high pass filter is electronically tunable.

6. The method of claim 1, further comprising utilizing a WLAN processor to control WLAN communications and a Bluetooth processor to control Bluetooth communications, and further comprising providing Bluetooth channel information from the Bluetooth processor to the WLAN processor after the hopping step.

7. An information handling system having reduced interference between simultaneous Bluetooth and WLAN communications, comprising:
   a Bluetooth transceiver configured to provide Bluetooth communications;
   a Bluetooth baseband processor coupled to the Bluetooth transceiver;
   a WLAN transceiver configured to communicate on a channel for WLAN communications; and
   a WLAN baseband processor coupled to the WLAN transceiver;
   wherein the Bluetooth transceiver and the WLAN transceiver are configured for simultaneous communications;
   wherein the Bluetooth communications hop from channel to channel to each one of a plurality of different channels for the Bluetooth communications; and
   wherein the WLAN transceiver comprises configurable front-end filter circuitry including a low pass filter and a high pass filter and having a control signal, the control signal being repeatedly adjusted for the plurality of different channels used for the Bluetooth communications, and each adjustment being based upon a frequency location for each of the plurality of different channels to select the low pass filter if the channel for Bluetooth communications is higher than the channel for WLAN communications and to select the high pass filter if the channel for Bluetooth communications is lower than the channel for WLAN communications.

8. The system of claim 7, wherein the WLAN baseband processor is configured to receive Bluetooth channel information from the Bluetooth baseband processor and to use the Bluetooth channel information to generate the control signal.

9. The system of claim 7, wherein the front-end filter circuitry comprises a switch coupled to the low pass filter and the high pass filter, the switch configured to select the low pass filter or the high pass filter based upon the control signal.

10. The system of claim 7, wherein the WLAN communications comprise WiFi communications.

11. The system of claim 7, wherein the Bluetooth communications are configured to utilize an adaptive frequency hopping channel avoidance scheme.

12. The system of claim 7, wherein a corner frequency for the low pass filter is electronically tunable.

13. The system of claim 7, wherein a corner frequency for the high pass filter is electronically tunable.

14. The system of claim 7, wherein the WLAN baseband processor is configured to receive Bluetooth channel information from the Bluetooth baseband processor when the Bluetooth transceiver hops to a new channel.

* * * * *